US009571515B2

(12) United States Patent
Carter et al.

(10) Patent No.: US 9,571,515 B2
(45) Date of Patent: Feb. 14, 2017

(54) NOTIFICATION OF SECURITY QUESTION COMPROMISE LEVEL BASED ON SOCIAL NETWORK INTERACTIONS

(71) Applicant: International Business Machines Corporation, Armonk, NY (US)

(72) Inventors: Bernadette Alexia Carter, Raleigh, NC (US); Al Chakra, Apex, NC (US); Lori Debra Landesman, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 13/740,217

(22) Filed: Jan. 13, 2013

(65) Prior Publication Data
US 2014/0007242 A1 Jan. 2, 2014

Related U.S. Application Data

(63) Continuation of application No. 13/537,157, filed on Jun. 29, 2012.

(51) Int. Cl.
*H04L 29/06* (2006.01)
(52) U.S. Cl.
CPC .................. *H04L 63/1433* (2013.01)
(58) Field of Classification Search
CPC ...... H04L 63/10; H04L 63/102; H04L 63/105; H04L 63/107; H04L 63/1433
See application file for complete search history.

(56) References Cited

U.S. PATENT DOCUMENTS

| | | | |
|---|---|---|---|
| 7,257,834 B1 | 8/2007 | Boydstun et al. | 726/1 |
| 7,908,645 B2 | 3/2011 | Varghese et al. | 726/4 |
| 8,555,357 B1* | 10/2013 | Gauvin | 726/6 |
| 2005/0039057 A1* | 2/2005 | Bagga et al. | 713/202 |
| 2005/0097320 A1 | 5/2005 | Golan et al. | 713/166 |
| 2009/0119475 A1 | 5/2009 | Lange et al. | 711/173 |
| 2010/0114776 A1 | 5/2010 | Weller et al. | 705/44 |
| 2010/0122341 A1 | 5/2010 | Golle et al. | 726/21 |
| 2010/0229223 A1 | 9/2010 | Shepard et al. | 726/5 |
| 2010/0241652 A1 | 9/2010 | Fasihuddin et al. | |
| 2011/0023101 A1 | 1/2011 | Vernal et al. | 726/7 |
| 2011/0029902 A1 | 2/2011 | Bailey | 715/764 |
| 2011/0047117 A1 | 2/2011 | Sinha | |

(Continued)

OTHER PUBLICATIONS

Office Action for U.S. Appl. No. 13/537,162, U.S. Patent and Trademark Office, mailed Dec. 26, 2013, 14 pages.

(Continued)

*Primary Examiner* — Brandon Hoffman
*Assistant Examiner* — Thong Truong
(74) *Attorney, Agent, or Firm* — VanLeeuwen & VanLeeuwen; David B. Woaycechowsky

(57) ABSTRACT

An approach is provided to improve security of security questions. In the approach, the system prompts a user for a security question. The security question and security answer associated with the security question are received by the system using a user input to the information handling system. Network-accessible data stores, such as social network accounts, are searched for the security answer resulting in search results. The searching results reveal a risk level which is identified by the system. The identified risk level is provided to the user, such as at a display device.

7 Claims, 11 Drawing Sheets

(56) References Cited

U.S. PATENT DOCUMENTS

2012/0167225 A1 6/2012 Gomez et al.
2013/0318580 A1 11/2013 Gudlavenkatasiva et al.

OTHER PUBLICATIONS

Office Action for U.S. Appl. No. 13/741,163, U.S. Patent and Trademark Office, mailed Jan. 17, 2014, 14 pages.
"Internet—Why Security Questions Can Be Bad News," Envision Programming, 2007-2012, 3 pages.
Dignan, "Social networks: A great place to mine your alleged security questions," Nov. 2010, 2 pages.
"Americans Exposing Answers to Common Security Questions and Identities on Social Networks," ID Analytics, Nov. 2010, 2 pages.

* cited by examiner

NOTIFICATION OF SECURITY QUESTION COMPROMISE LEVEL BASED ON SOCIAL NETWORK INTERACTIONS

TECHNICAL FIELD

The present disclosure relates to an approach that identifies whether a security question and answer have been compromised based on information available to a social network.

BACKGROUND OF THE INVENTION

Security questions are a popular method used to ensure that a user is the actual person associated with an online account. However, given the level of information that is shared on purpose or inadvertently by the account holder, an acquaintance, or a complete stranger, in social networks, blogs, etc, it is often difficult to ascertain what pieces of information are suitable for use as a security question. One risk is that the account holder deliberately or inadvertently disclosed the potential security question and answer. While the account holder may not recall or remember such dissemination, the information may be available to others through a social network or through a computer network, such as the Internet. Another risk is that, while the account holder may have never disseminated the answer to a security question, someone else has divulged such information. For example, a popular security question is "What was your mother's maiden name?" While the user may have never divulged his mother's maiden name, a sibling, spouse, or other person may have divulged this information in a manner where strangers can easily ascertain the user's mother's maiden name.

SUMMARY

An approach is provided to improve security of security questions. In the approach, the system prompts a user for a security question. The security question and security answer associated with the security question are received by the system using a user input to the information handling system. Network-accessible data stores, such as social network accounts, are searched for the security answer resulting in search results. The searching results reveal a risk level which is identified by the system. The identified risk level is provided to the user, such as at a display device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
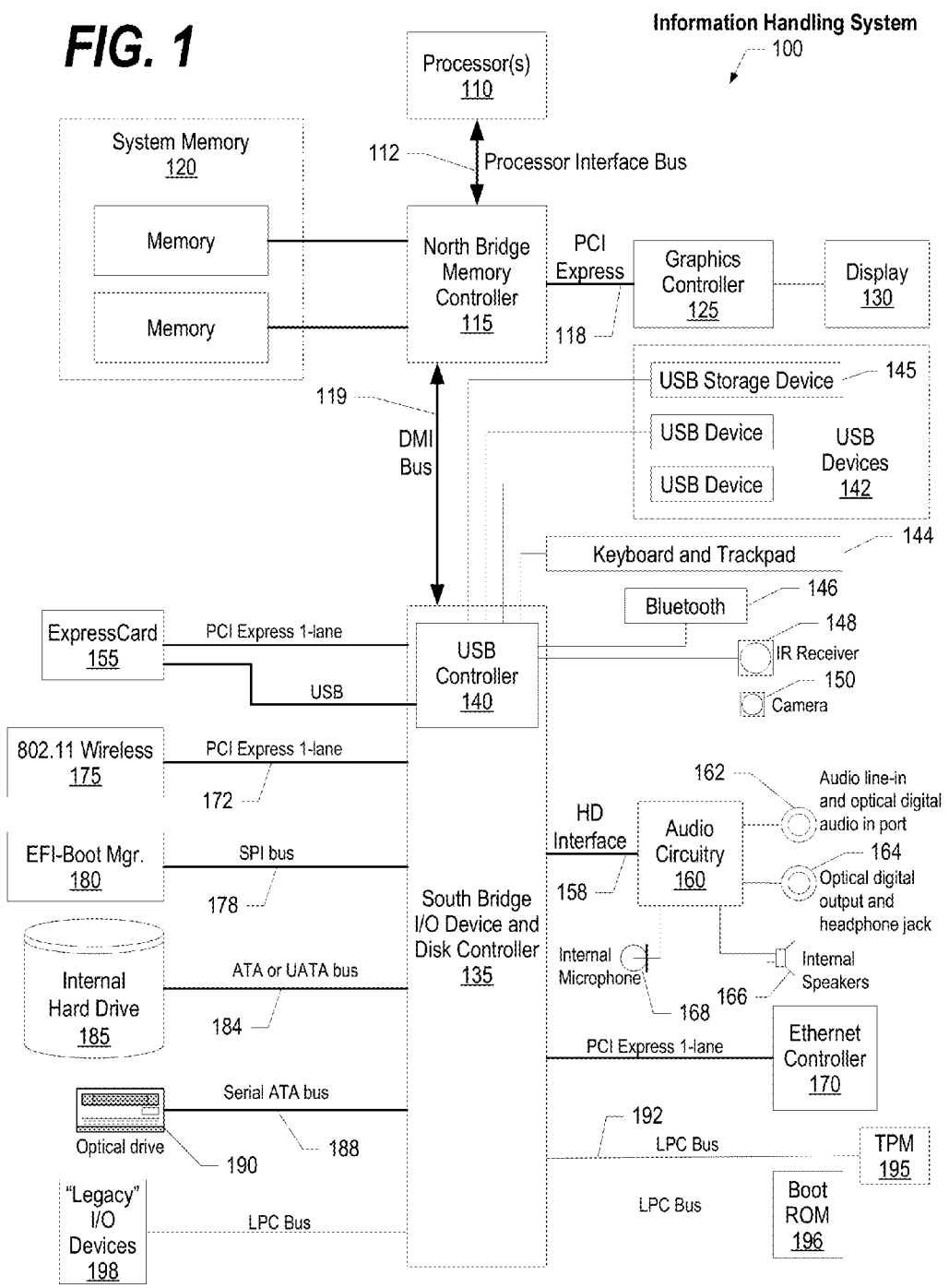
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
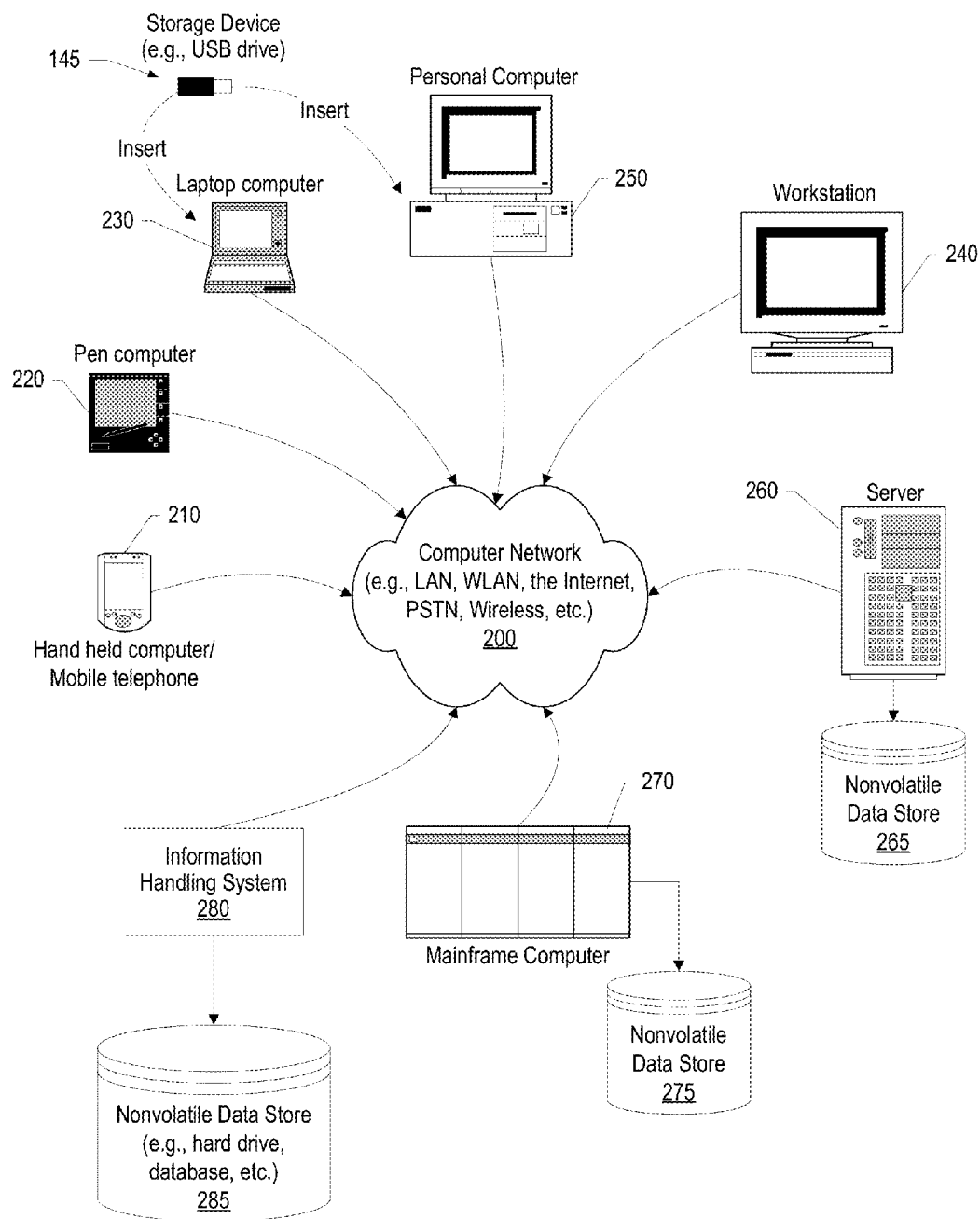
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 depict an approach that can be executed on an information handling system and computer network as shown in FIGS. 1-2. In this approach, a system receives a security question and a security answer and searches the user and his acquaintance's social network interactions, blog posts, chats, emails, text messages, any online publication, etc. (data accessible through a network connection) for the corresponding answer. If the corresponding answer has been disclosed or published in a manner that references the user or an acquaintance of the user, the system notifies the user during the security question selection process of the potential breach. Therefore, this approach allows the user to make an informed security question selection and prevents the user from selecting a question assumed to be secure, but which has been compromised. In addition, this approach provides the ability to store security questions selected in the past and periodically monitor the online activity in order to notify the user if it is compromised in the future.

Figure 3:
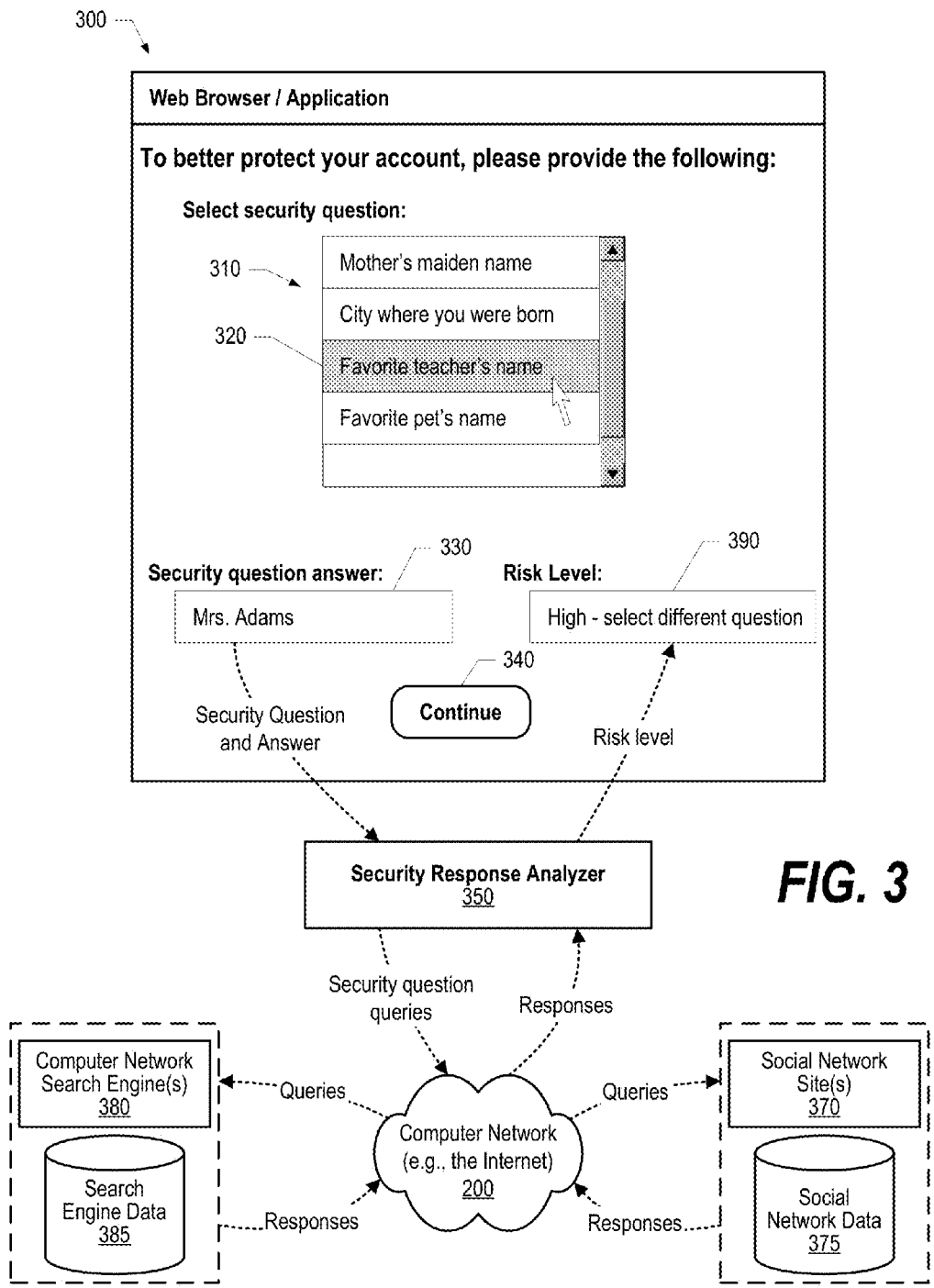
FIG. 3 is a screen and component diagram showing a user interacting with the system to select a security question.

FIG. 3 is a screen and component diagram showing a user interacting with the system to select a security question. Screen depiction 300 shows an example of a security dialog in which a user is asked to select a security question and provide a corresponding security answer in order to better secure the user's account.

Security question list or combo box 310 displays a number of security questions from which the user may select. In addition, in one embodiment, the user can enter a custom security question if the desired security question does not appear in combo box 310 (e.g., "Who is my favorite uncle?", etc.). In the example shown, the user has selected security question 320 relating to the name of the user's favorite teacher. Text box 330 is used by the user to enter the security answer to the selected security question. In the example, the user has indicated that the name of the user's favorite teacher is "Mrs. Adams." When the user has selected the security question and the security answer, then the user selects command button 340 ("Continue"). When command button 340 is selected, the security question and security answer are provided to security response analyzer process 350 which analyzes the security of the user's security question and answer.

Security response analyzer process 350 searches network-accessible data stores for the security answer. In the example shown, network-accessible data stores include social network data stores 375 maintained by one or more social network sites 370. In addition, network-accessible data stores include search engine data stores 385 that are maintained by network search engines 380. Search results (responses) are received from the social network sites and the computer network search engines. Security response analyzer process 350 identifies a risk level that pertains to the user's selected security question based on the received search results. In one embodiment, the risk level is calculated based on both the accessibility of the security answer as well as the association of the answer to the user. The identified risk level is then transmitted to the user, such as by displaying the risk level in text box 390 shown in screen 300. In non-visual environments, the risk level can be transmitted to the user in a non-visual format (e.g., using audible or tactile feedback, etc.). In the example shown, the risk level is chosen from "High," "Medium," and "Low." In other embodiments, the risk level may be a numeric or alphanumeric representation (e.g., a range of risk level 1 representing very low risk to risk level 10 representing a very high risk level, etc.).

Figure 4:
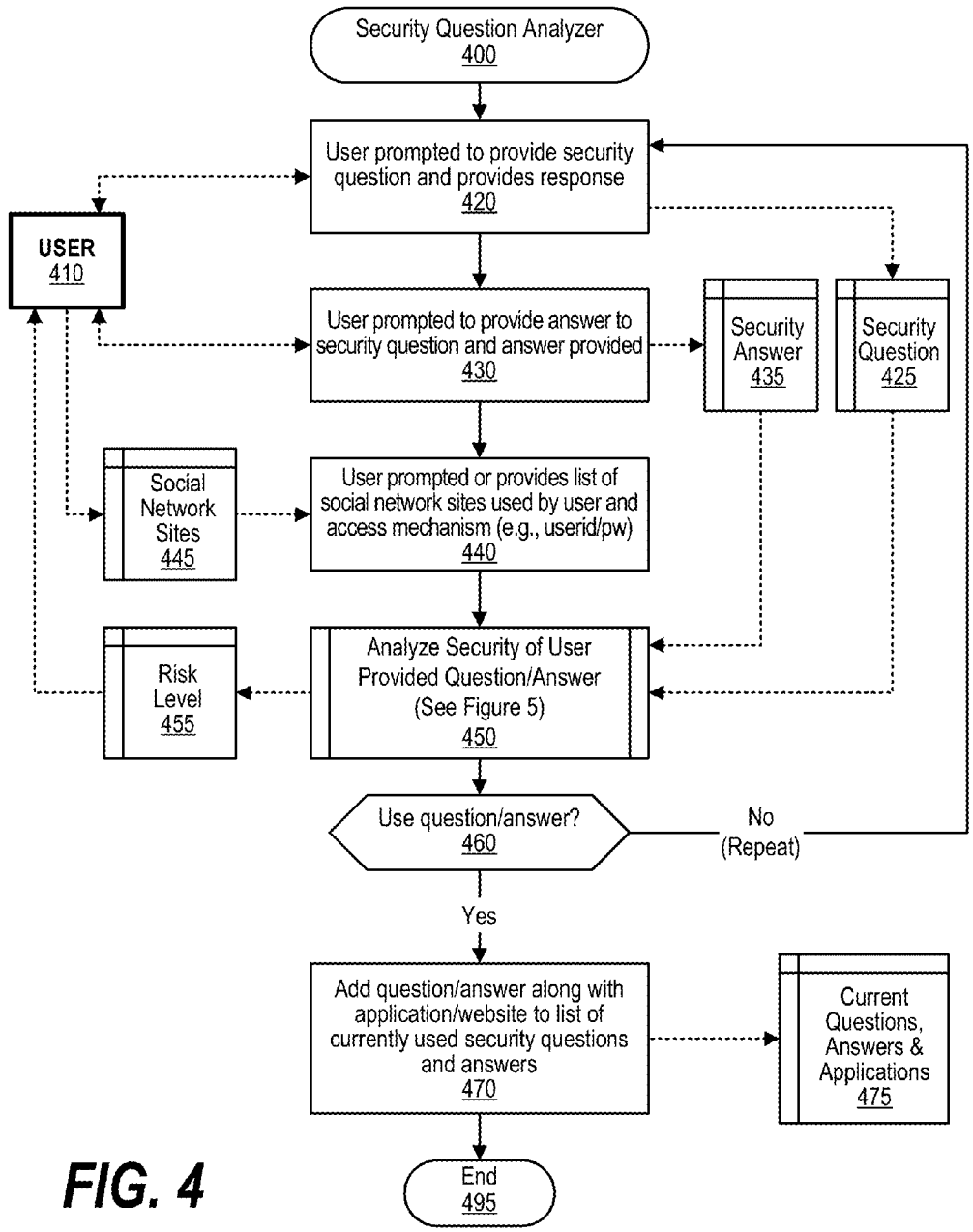
FIG. 4 is a flowchart showing steps performed by a process that analyzes a proposed security question.

FIG. 4 is a flowchart showing steps performed by a process that analyzes a proposed security question. Processing commences at 400 whereupon, at step 420, the process prompts user 410 to provide a security question and the user responds accordingly. The security question selected by user 410 is stored in memory area 425. At step 430, the user is prompted to provide a security answer that corresponds to the selected security question. The security answer provided by user 410 is stored in memory area 435.

At step 440, the user provides a list of social network sites frequented by the user as well as access mechanisms, such as the user's user identifier and password, used by the user to access the social network sites. The list of social network sites and access mechanisms may be maintained in data store 445 which is stored in a secured memory (e.g., encrypted, inaccessible to others, etc.). As an alternative, the system could search on the normal social networks or use cookie or use the user's browser history information to gather social network access data rather than having the user manually provide a list of social networks in data store 445. Configuring data store 445 allows the user to identify the social network sites and access mechanisms used by the user without having to repeatedly create the list each time a security question is being analyzed.

The process shown could be provided as an external service that is "plugged in" to the user's system, such as through the web browser utilized by the user. For example, a security question web service used in bank systems may be plugged into their existing infrastructure to provide security analysis. In addition, users might already have an account setup with the service that includes all of their social network credentials, etc. Therefore, users may enter the credentials for this service which will perform the analysis given the inputs that the bank application sends it and then service returns back to the bank site the info to display about security level. At that point the bank website may determine what level of security is needed to be used by the bank's customers. Moreover, the site itself could have a policy of not allowing security questions/answers that have a particular risk level (e.g., only allowing "low" risk levels, etc.).

Figure 5:
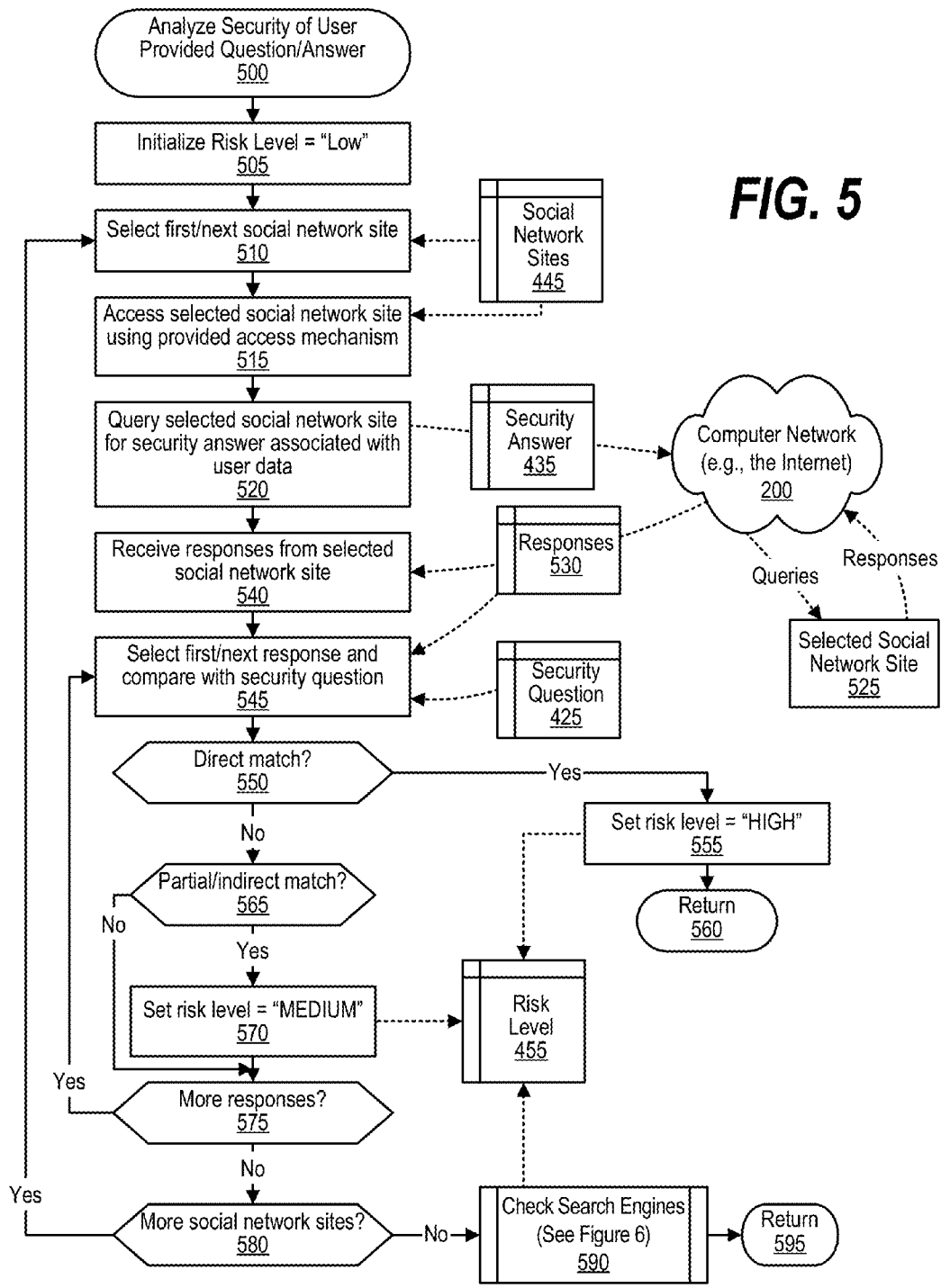
FIG. 5 is a flowchart showing steps performed by a process that analyzes the security of the proposed security question in light of the answer provided by the user.

At predefined process 450, the process analyzes the security of the user provided security question and answer (see FIG. 5 and corresponding text for processing details). Predefined process 450 retrieves the security question from memory area 425 and the corresponding security answer from memory area 435. The result of predefined process 450 is a risk level which is stored in memory area 455 and provided to user 410 (e.g., displayed on a display screen, etc.).

A decision is made as to whether the user wishes to utilize the selected security question and corresponding security answer based upon the risk level identified by predefined process 450 (decision 460). If the user (or the security process) decides that the selected security question and corresponding security answer are too risky, then decision 460 branches to the "no" branch which loops back and allow the user to select a different security question and corresponding security answer with the process repeating the steps and generating another risk level for the newly selected security question and corresponding security answer. This looping continues until a security question and corresponding security answer have been selected that provide a low (acceptable) level of risk. When a security question and corresponding security answer have been selected that provide an acceptable level of risk, then decision 460 branches to the "yes" branch whereupon, at step 470, the security question and security answer are stored in current security questions, answers, and applications data store 475. In addition, at step 470, an identifier (e.g., website, application name, etc.) corresponding to where the selected security question and answer is also stored in data store 475. The list of current security questions, security answers, and application names can be used to periodically recheck the risk level associated with various security questions and answers. For example, the user or someone else may deliberately or inadvertently disclose the answer to one of the user's existing security questions. When this happens, the risk level associated with the security question and answer increases and user 410 can be alerted in order to change the security question and security answer to a less risky alternative. Processing by the security question analyzer thereafter ends at 495.

FIG. 5 is a flowchart showing steps performed by a process that analyzes the security of the proposed security question in light of the answer provided by the user. Processing commences at 500 whereupon, at step 505, the risk level is initialized to a "low" risk level. At step 510, the first social network site is selected from the list of social network sites maintained in data store 445. At step 515, the selected social network site is accessed using the access mechanism provided by the user (e.g., the user's user identifier and password, etc.).

At step 520, the selected social network is queried for the security answer associated with the user's social networking data. The query of the social network site queries both comment areas (e.g., users' "walls," etc.) as well as document repositories maintained by the selected social network (e.g., a shared drive provided to social network users, etc.). As used herein, "posts" includes any content in the social network such as comments and the like viewable in the social network as well as documents posted to the social network (e.g., stored on a virtual drive provided by the social network, etc.). Security answer 435 is transmitted in a query request to selected social network site 525. At step 540, responses 530 are received from the selected social network site with the responses corresponding to the query regarding the user's security answer.

Some social networks provide search capabilities to the posts and other content stored in the social network. Social network content can be available via search engines. In some social network configurations, there is a user setting that sets whether search engines can access the user's profile. In addition, some social networks do provide application programming interfaces (APIs) that allow developers to access information available on the social network. In addition, if a system such as the one disclosed herein was implemented as a service in a social network, the system would have access to all information stored in the social network. So, either native search capabilities or a custom search capability using the social network APIs can be used to provide the query function used to query the social network site.

At step 545, the first response received from the social network site is selected and the selected response is compared with the security question retrieved from memory area 425. For example, if the security question was "Favorite teacher?" and the security answer was "Mrs. Adams", then responses 530 will be related to occurrences of the last name "Adams," such as postings or discussions regarding someone with the name "Adams." The comparison with the security question identifies whether responses are concerning an "Adams" that is a "teacher," "instructor," "mentor," etc. as well as responses that are direct hits (e.g., "my favorite teacher back in elementary school was Mrs. Adams," etc.). In one embodiment, instead of comparing the security question with the security answer the system simply searches for either the security question or the security answer and compares the results with the user identity. For example, the system might search of "favorite teacher" and compare the results with those related to the user (e.g., the former student) rather than with the security answer (e.g., "Mrs. Adams, etc.). Likewise, the system might search for the security answer (e.g., "Mrs. Adams) and compare the results with those related to the user (e.g., the former student) rather than with the security question.

A decision is made as to whether a direct match was found in the responses for the security answer in relation to the security question (decision 550). If a direct match was found, then decision 550 branches to the "yes" branch whereupon, at step 555, the process sets the risk level to "High" in memory area 455 indicating that use of this security question and security answer would be risky in that such an answer would be readily ascertainable within the social network community. Processing then returns to the calling routine (see FIG. 4) at 560.

Returning to decision 550, if a direct match was not found, then decision 550 branches to the "no" branch whereupon a decision is made as to whether a partial or indirect match was found (decision 565). For example, if the user discusses a group of teachers that includes "Mrs. Adams," then, while it might not be obvious that Mrs. Adams was the user's favorite teacher, such a deduction could be made given the list of former teachers provided by the user. If a partial, or indirect, match is identified, then decision 565 branches to the "yes" branch whereupon, at step 570, the process sets the risk level to a "Medium" level to indicate that the answer to the security question may be ascertained with somewhat more effort given the data available to social network users. This "medium" level of risk is stored in memory area 455. Returning to decision 565, if a partial/indirect match was not identified, then decision 565 branches to the "no" branch bypassing step 570, leaving the current risk level in place.

A decision is made as to whether the search returned more search results to analyze (decision 575). If more responses were returned, then decision 575 branches to the "yes" branch which loops back to select and process the next search result. This looping continues until either a direct match is identified (whereupon processing returns at 560) or until there are no more responses to process from the selected social network site, at which point decision 575 branches to the "no" branch. In one embodiment, continued analysis may be performed even after receiving a direct hit in order to obtain a more complete understanding of the level of divulgence pertaining to the security question and answer. For example, there are differences between public posts and private messages directly to an individual, such as a close relative. If the direct message is hit first, it may be advantageous to continue searching in order to detect any public post that include the same security question/answer.

If there are no more responses to process from the selected social network site (decision 575 branching to the "no" branch), then a decision is made as to whether there are additional social network sites to select and query as described above (decision 580). If there are more social network sites to select and query, then decision 580 branches to the "yes" branch which loops back to select and query the next social network sites. This looping continues until either a direct match is identified (with processing returning to the calling routine at 560) or until all of the identified social network sites have been processed. When all of the social network sites have been processed, then decision 580 branches to the "no" branch whereupon, at predefined process 590, a check is performed using available search engines (see FIG. 6 and corresponding text for processing details). After the available search engines have been checked, processing returns to the calling routine (see FIG. 4) at 595.

Figure 6:
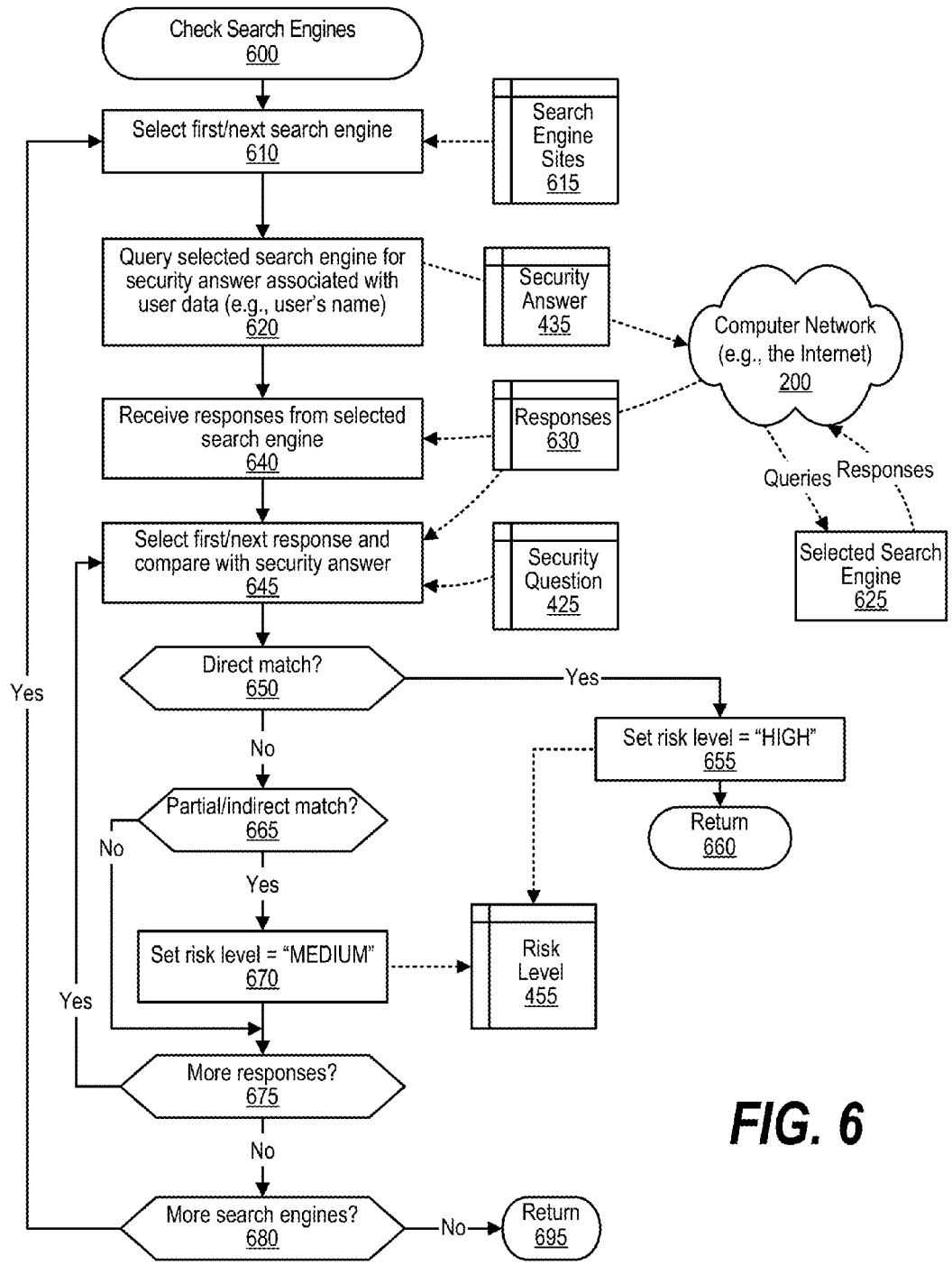
FIG. 6 is a flowchart showing steps performed to analyze the proposed security question and answer using available search engines.

FIG. 6 is a flowchart showing steps performed to analyze the proposed security question and answer using available search engines. The processing performed in FIG. 6 is similar to the processing performed in FIG. 5, however in FIG. 5 the queries were directed to social networks while in FIG. 6 the queries are directed to search engines.

Processing commences at 600 whereupon, at step 610, the first search engine site is selected from the list of search engine sites maintained in data store 615. At step 620, the selected search engine is queried for the security answer associated with the user's identity (e.g., the user's name, etc.). Security answer 435 is transmitted in a query request to selected search engine 625. At step 640, responses 630 are received from the selected search engine site with the responses corresponding to the query regarding the user's security answer.

At step 645, the first response received from the search engine is selected and the selected response is compared with the security question retrieved from memory area 425. For example, if the security question was "Favorite teacher?" and the security answer was "Mrs. Adams", then responses 630 will be related to occurrences of the last name "Adams," such as postings or discussions regarding someone with the name "Adams." The comparison with the security question identifies whether responses are concerning an "Adams" that is a "teacher," "instructor," "mentor," etc. as well as responses that are direct hits (e.g., "my favorite teacher back in elementary school was Mrs. Adams," etc.). It will be apparent to those skilled in the art that methods for matching, searching, semantic analysis, etc. are well known to those skilled in the art (and therefore do not need to be described in detail herein). Matches will arise even when an exact answer has not been divulged. Using deductive reasoning, a breach can be detected based on a match with a question. For example, in a post a user states "I just met Mrs. Smith, my favorite teacher's mom." While the actual security answer ("Mrs. Adam's") is not referenced in the post, the system will match the "favorite teacher" in the post with the question and find references to the name "Mrs. Smith" and then further relate "Mrs. Smith" to "Mrs. Adams" given the posted relationship of "mom" and identifying relationships to "Mrs. Smith" (e.g., "friends" of "Mrs. Smith" listed in the social network, etc.). In this manner, while "Mrs. Adams" was never mentioned, through deductive reasoning the system would detect a possible security breach with the security question and answer.

A decision is made as to whether a direct match was found in the responses for the security answer in relation to the security question (decision 650). If a direct match was found, then decision 650 branches to the "yes" branch whereupon, at step 655, the process sets the risk level to "High" in memory area 455 indicating that use of this security question and security answer would be risky in that such an answer would be readily ascertainable within the social network community. Processing then returns to the calling routine (see FIG. 5) at 660.

Returning to decision 650, if a direct match was not found, then decision 650 branches to the "no" branch whereupon a decision is made as to whether a partial or indirect match was found (decision 665). For example, if the user discusses a group of teachers that includes "Mrs. Adams," then, while it might not be obvious that Mrs. Adams was the user's favorite teacher, such a deduction could be made given the list of former teachers provided by the user. If a partial, or indirect, match is identified, then decision 665 branches to the "yes" branch whereupon, at step 670, the process sets the risk level to a "Medium" level to indicate that the answer to the security question may be ascertained with somewhat more effort given the data available to online users. This "medium" level of risk is stored in memory area 455. Returning to decision 665, if a partial/indirect match was not identified, then decision 665 branches to the "no" branch bypassing step 670, leaving the current risk level in place.

A decision is made as to whether the search returned more search results to analyze from this search engine (decision 675). If more responses were returned from this search engine, then decision 675 branches to the "yes" branch which loops back to select and process the next search result. This looping continues until either a direct match is identified (whereupon processing returns at 660) or until there are no more responses to process from the selected search engine, at which point decision 675 branches to the "no" branch.

If there are no more responses to process from the selected search engine (decision 675 branching to the "no" branch), then a decision is made as to whether there are additional search engines to select and query as described above (decision 680). If there are more search engines to select and query, then decision 680 branches to the "yes" branch which loops back to select and query the next search engine. This looping continues until either a direct match is identified (with processing returning to the calling routine at 660) or until all of the identified search engines have been processed. When all of the search engines have been processed, then decision 680 branches to the "no" branch whereupon processing returns to the calling routine (see FIG. 5) at 695.

Figure 7:
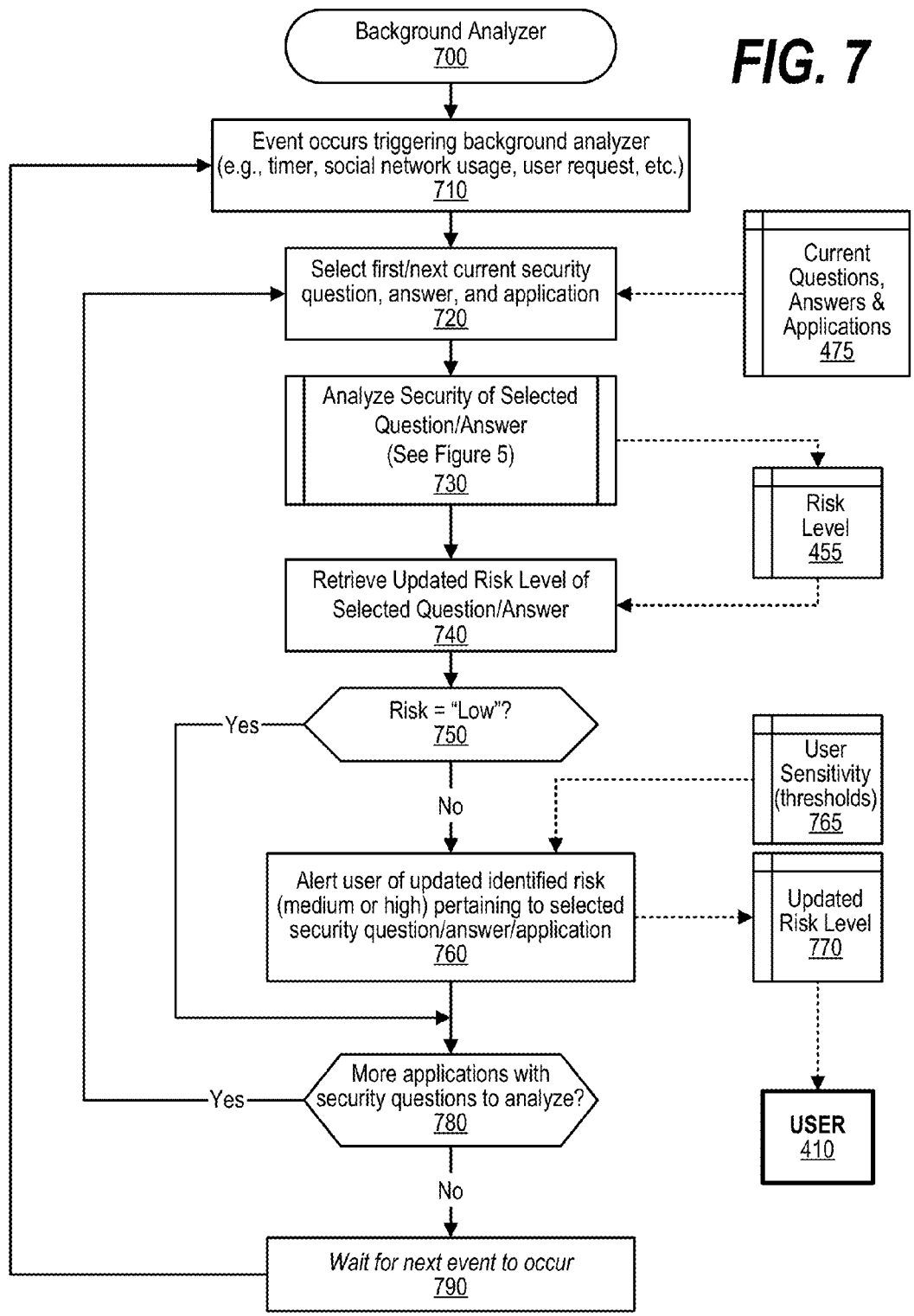
FIG. 7 is a flowchart showing steps performed by a background security analyzer that periodically checks the security of the user's security questions and answers and notifies the user if such question/answer combinations have been compromised.

FIG. 7 is a flowchart showing steps performed by a background security analyzer that periodically checks the security of the user's security questions and answers and notifies the user if such question/answer combinations have been compromised. Background analyzer processing commences at 700 whereupon, at step 710, an event occurs to trigger processing by the background analyzer. For example, the background analyzer can be programmed to execute on a timely basis (e.g., daily, etc.), when an amount of social network activity has been detected, upon a user request, or any other desired condition that should trigger the background analyzer.

As shown in FIG. 4, when a security question and security answer are successfully selected for an application, the data is stored in data store 475. At step 720, the first application (e.g., website, online account, etc.) is selected from data store 475 along with the security question and security answer currently being used for the selected application.

At predefined process 730, the selected security question and security answer are analyzed by the security analysis routine (see FIG. 5 and corresponding text for processing details). The results of predefined process 730 is an updated risk level that is stored in memory area 455. This updated risk level is retrieved at step 740.

A decision is made as to whether the updated risk level is "Low" (decision 750). If the updated risk level is not "Low", then decision 750 branches to the "no" branch whereupon, at step 760, the user is alerted of an updated risk level pertaining to the selected application that uses the selected security question and answer. In one embodiment, the updated risk level is compared to a user sensitivity threshold that indicates the user's tolerance for risk. For example, the user may indicate that he does not wish to be alerted unless the process identifies a "High" risk level. The user sensitivity threshold is retrieved from memory area 765. In another embodiment, the user may indicate that he does not wish to be alerted unless the updated risk level is greater than the previous risk level associated with the security question and answer. For example, when the user set up the security question and answer, the original risk level may have been identified as "Medium" but the user elected to use the selected security question and answer despite the risk. If the updated risk level is still at a "Medium" level, then the user, in this embodiment, would not be alerted. If the user is being alerted, then user 410 is alerted as to the updated risk level (770) which is conveyed along with the selected application. In this manner, the user can change the security question and security answer at the selected application in order to choose a more secure question and answer with a lower level of risk. Returning to decision 750, if the risk level is found to be "Low", then decision 750 branches to the "yes" branch bypassing step 760. In one embodiment, a "dashboard" type display is provided in which all of the user's security questions and answers are securely provided to the user with their current associated risk levels as well as any trends as security risk levels have changed over time.

A decision is made as to whether there are more applications stored in data store 475 with security questions and security answers that need to be analyzed using the background analyzer (decision 780). If there are additional applications to select, then decision 780 branches to the "yes" branch which loops back to select the next application along with the security question and security answer currently in place at the application. The security question and answer are analyzed as described above with the user being alerted if the updated risk level meets certain criteria. This looping continues until there are no more applications to select from data store 475, at which point decision 780 branches to the "no" branch. At step 790, processing enters a wait state whereupon the process waits for the next trigger, as described above, to occur. When the next trigger occurs, then processing loops back to the beginning of the process (step 710) to re-execute the steps of the background analyzer process as described above.

Figure 8:
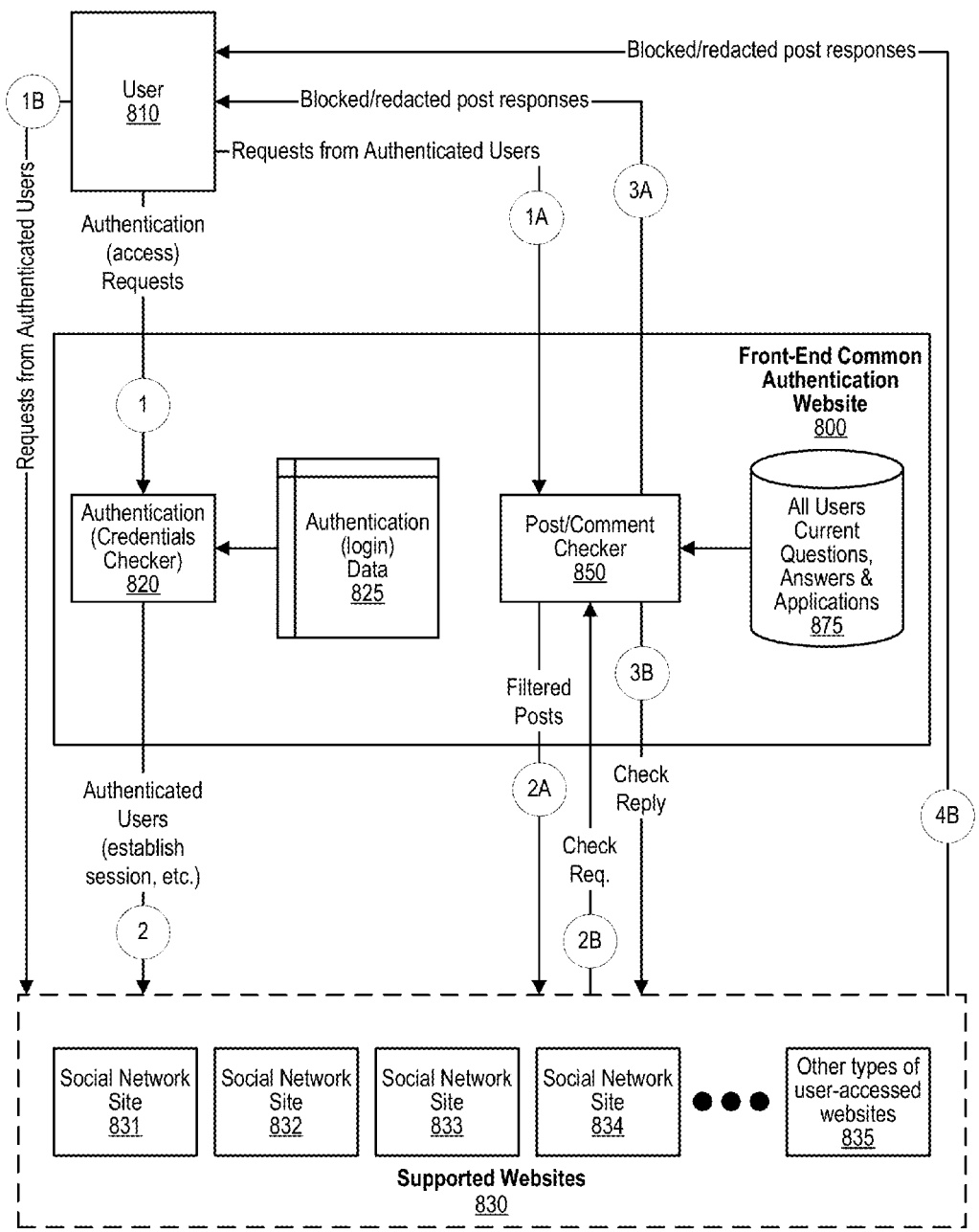
FIG. 8 is a flow diagram that shows flows between components of a set of social networks and processes that identify whether incoming posts compromise previously established security questions and answers.

FIG. 8 is a flow diagram that shows flows between components of a set of social networks and processes that identify whether incoming posts compromise previously established security questions and answers. Front-end common authentication website 800 performs both user authentication processing and checks whether incoming posts compromise previously established security questions and answers. In one embodiment, website 800 is a service that is used by supported websites 830 which can include both social networks as well as non-social network sites (e.g., social network sites 831, 832, 833, and 834 as well as non-social network site 835). In addition, website 800 may also be a social network website, such as a large, general purpose social network with supported websites including both general purpose social networks as well as niche social network that support a particular user community.

In one embodiment, user 810 accesses supported websites 830 by providing authentication data (e.g., user identifier, password, etc.) to front-end common authentication website 800 in dataflow 1. Authentication process 820 authenticates the authentication data provided by the user that is attempting to log onto one of the websites (either website 800 or one of supported websites 830). If the user is successfully authenticated, then authentication process 820 provides authenticated users' credentials to the supported website (830) to which the user's authentication request is directed in dataflow 2.

Once user 810 has been authenticated and has established a session with one of website 800 or one of supported websites 830, then the user can requests posts to various content areas of the website with which the user has established the session. In FIG. 8, two different embodiments are shown based upon whether front-end common authentication website 800 is being used to filter posts directed to supported websites 830, or whether the supported websites are using the front-end common authentication website as a service to check requested posts on the supported website's behalf.

Figure 9:
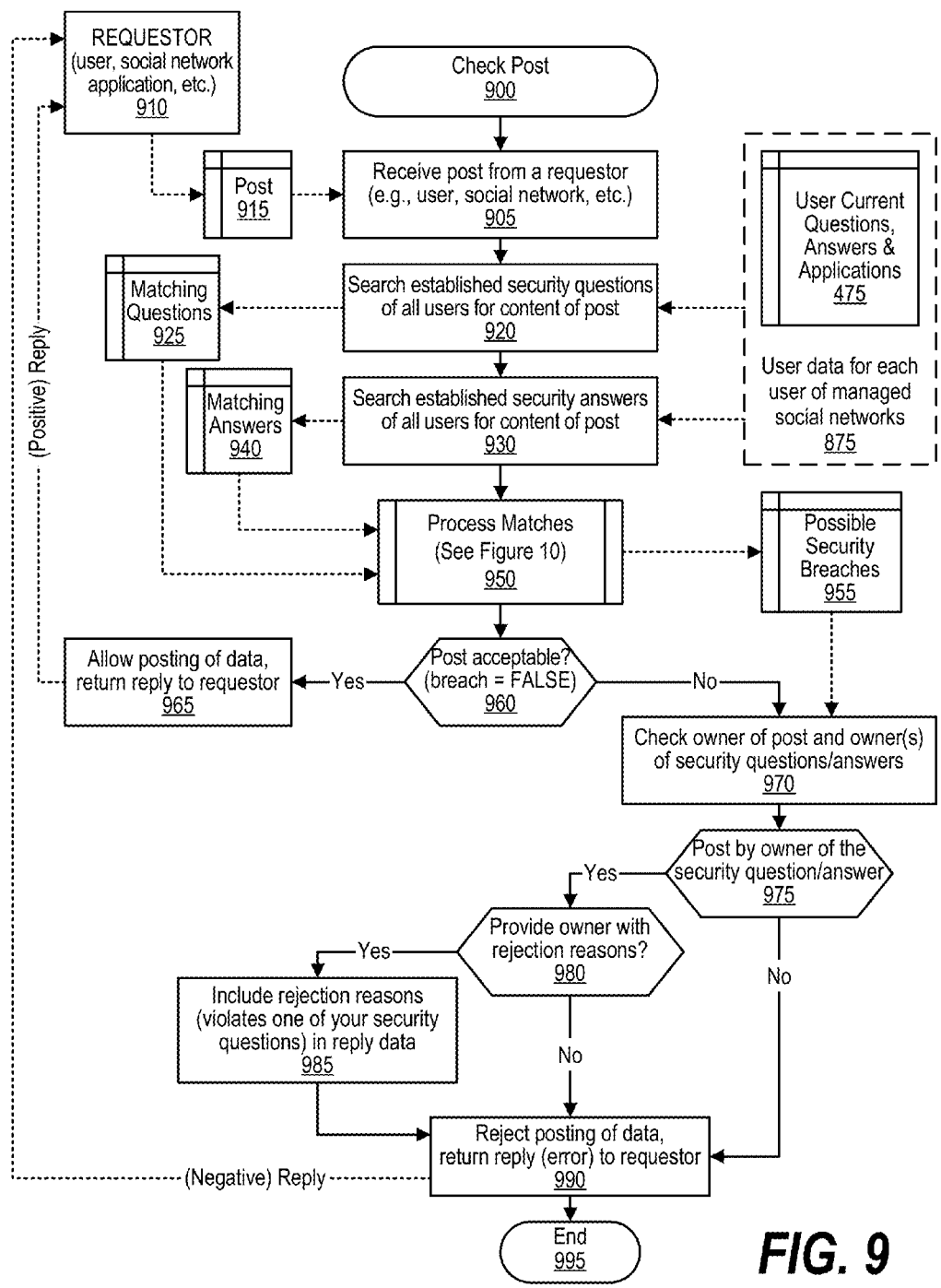
FIG. 9 is a flowchart showing the steps taken by a process that identifies incoming posts that compromise previously established security questions and answers.

In the first embodiment, where front-end common authentication website 800 is being used to filter posts directed to supported websites 830, user post requests (dataflow 1A) are shown being directed (or redirected) to front-end common authentication website 800 where front-end common authentication website's process 850 is performed to check the requested post based on previously established security questions and answers for all users of all of the websites (website 800 as well as supported websites 830). The previously established security questions and answers for all of the users are stored in data store 875. As shown in FIG. 9, front-end common authentication website 800 checks whether the requested post compromises a previously established security questions and answers of one of the users. If the requested post fails to compromise any of the previously established security questions and answers, then a filtered post is sent to the supported website with which the user previously established a session (dataflow 2A). The supported website receives the post in dataflow 2A and updates content maintained by the website using the post contents. On the other hand, if the requested post compromises any of the previously established security questions and answers, then a rejection is sent back to user 810 (dataflow 3A) and the requested post is not transmitted to the supported website nor is the requested post added as content to any of the websites.

In the second embodiment, where front-end common authentication website 800 is being used as a service to check requested posts on the supported website's behalf (dataflow 1B) shows the user's requested post being sent directly to the supported website (830). Prior to updating the supported website's content with the post, the supported website sends a request (dataflow 2B) to front-end common authentication website 800 requesting a security check of the requested post. As previously described, front-end common authentication website's process 850 is performed to check the requested post based on previously established security questions and answers for all users of all of the websites (website 800 as well as supported websites 830). The previously established security questions and answers for all of the users are stored in data store 875. As shown in FIG. 9, front-end common authentication website 800 checks whether the requested post compromises a previously established security questions and answers of one of the users. A security check reply (dataflow 3B) is sent from front-end common authentication website 800 back to the requesting website (830). If the requested post fails to compromise any of the previously established security questions and answers, then dataflow 3B indicates that the post is safe to be posted at the requesting website (830), and the website handles the post operation. On the other hand, if the requested post compromises any of the previously established security questions and answers, then reply dataflow 3B indicates that the post is unsafe as it compromises one or more previously established security questions and answers, and the requesting website (830) rejects the requested post and sends the user a rejection reply (dataflow 4B).

FIG. 9 is a flowchart showing the steps taken by a process that identifies incoming posts that compromise previously established security questions and answers. Check processing commences at 900 whereupon, at step 905, a requested post (post 915) is received from requestor 910. As shown in FIG. 8, the requestor can be a user or a website that is checking the security of a post received from one of its users.

At step 920, the check process searches previously established security questions of all users for content included in post 915. As shown data store 875 is a collection of all user's previously established security questions and answers 475. In one embodiment, the previously established security questions and answers were established using the process previously shown and described in FIGS. 3-7. The questions that match items in post 915 are stored in matching questions memory area 925 for further analysis. In one embodiment, the identity of the owner of the security question that matches the requested post is also retained in memory area 925 in order to ascertain whether the owner intentionally, or unintentionally, attempted to compromise his own security question so that an appropriate warning can be conveyed to the owner (user).

At step 930, the check process searches previously established security answers of all users for content included in post 915. The answers that match items in post 915 are stored in matching answers memory area 940 for further analysis. As described above, in one embodiment, the identity of the owner of the security answer that matches the requested post is also retained in memory area 925 in order to ascertain whether the owner intentionally, or unintentionally, attempted to compromise his own security answer so that an appropriate warning can be conveyed to the owner (user).

Figure 10:
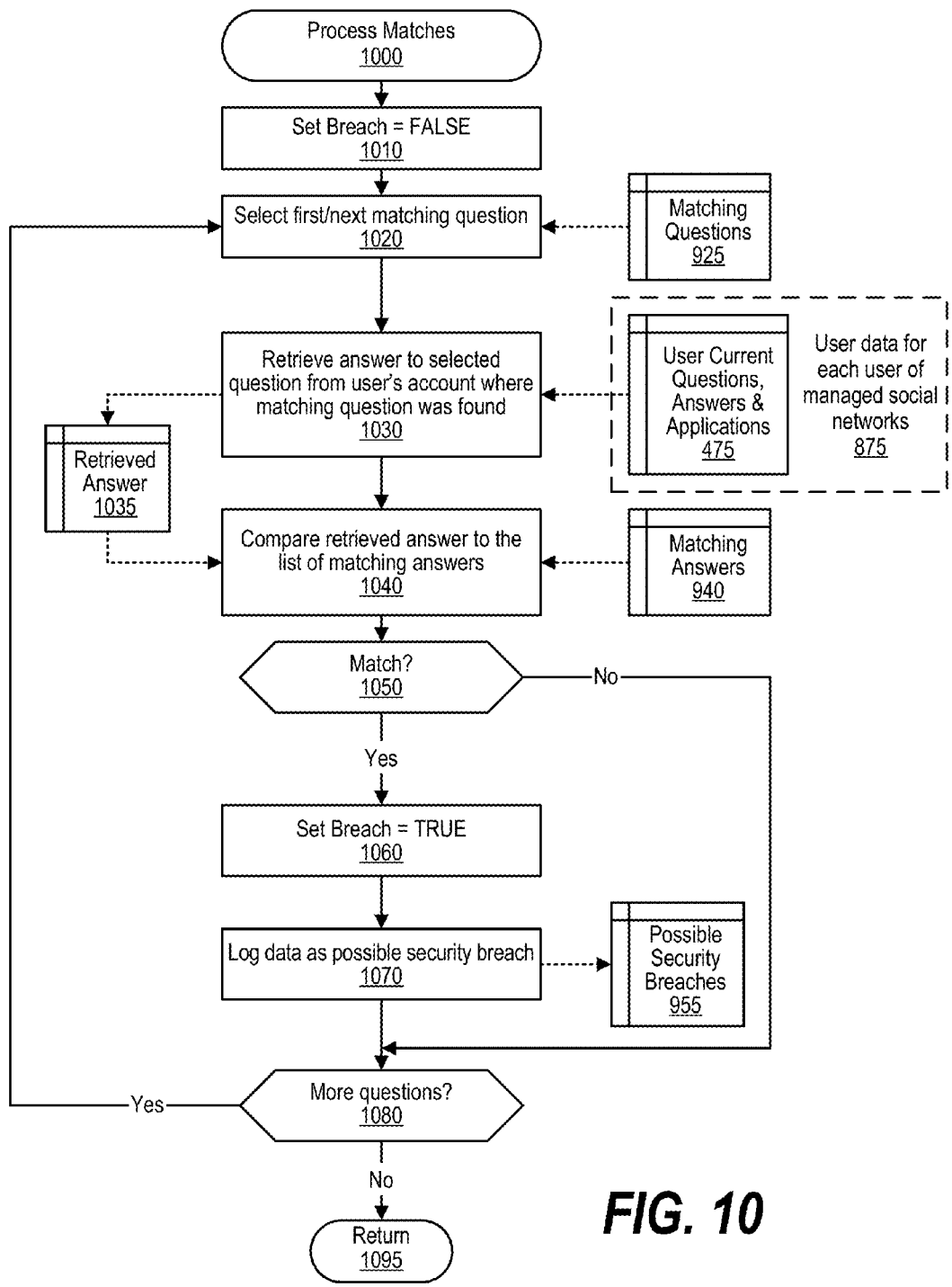
FIG. 10 is a flowchart, called by the processing shown in FIG. 9, that processes matches between the incoming post and the previously established security questions and answers.

At predefined process 950, the matching questions are compared with the matching answers to identify possible security breaches that are stored in memory area 955 (see FIG. 10 and corresponding text for processing details). After predefined process 950 has executed revealing any possible security compromises, a decision is made as to whether the requested post is acceptable (decision 960). The requested post is acceptable if the comparison performed in predefined process 950 reveal that the contents of the requested post fail to compromise any of the previously established security questions and answers. If the requested post is acceptable, then decision 960 branches to the "yes" branch whereupon, at step 965, the requested post is allowed and an appropriate "post allowed" reply is returned to requestor 910.

On the other hand, if the requested post is unacceptable, then decision 960 branches to the "no" branch for further processing. A post is unacceptable, and therefore rejected, in response to the comparison performed in predefined process 950 revealing that the contents of the requested post compromises one of the previously established security questions and answers. At step 970, a check is made of possible security breach data stored in memory area 955 to ascertain whether the user that submitted the requested post is also the owner of the previously established security questions and answers that are compromised by the post. For example, the user may have previously used a favorite teacher as a security question and the name of the favorite teacher (e.g., "Mrs. Adams," etc.) as the corresponding security answer. Subsequently, the user may be discussing past school memories with friends and attempt to post "I remember back in school when my favorite teacher was Mrs. Adams, she was great!" Allowing such a post would compromise the user's previously established security question and answer, so the post is rejected. In one embodiment, the owner of a security answer/question is prompted a post may compromise a security question, however in this embodiment, the owner can allow the content to be posted anyway (e.g., if the site was not important to the user, the owner no longer had an intention to use the security question on the web sites which were in active use, the user deemed that the post was more important than a small security risk, etc.).

A decision is made as to whether the owner of the previously established security questions and answers is also the user that submitted post request 915 (decision 975). If the owner of the previously established security questions and answers is also the user that submitted post request 915, then decision 975 branches to the "yes" branch whereupon a decision is made as to whether the system is configured to provide the owner of the previously established security questions and answers with a reason for the rejected post (decision 980). If a reason is to be provided, then decision 980 branches to the "yes" branch whereupon, at step 985, the post rejection reasons (e.g., "you have a security question and corresponding security answer that would be compromised by this post," etc.) is included in the rejection reply data.

At step 990, the requested post is rejected. If the owner of the previously established security questions and answers is not the same as the user of the requested post (decision 975 branching to the "no" branch) or if the system is not configured to provide an owner with reasons that the post was rejected (decision 980 branching to the "no" branch) then the negative reply returned to requestor 910 does not include reasons for the rejection. However, if rejection reasons were included in the reply data at step 985, then these rejection reasons are included in the return reply to requestor 910. Processing performed to check a requested post thereafter ends at 995.

FIG. 10 is a flowchart, called by the processing shown in FIG. 9, that processes matches between the incoming post and the previously established security questions and answers. FIG. 10 processing commences at 1000 whereupon, at step 1010, a breach flag is initialized to FALSE indicating that none of the previously established security questions and answers are currently compromised by the user's requested post.

At step 1020, the first matching question that resulted from the search of the requested post contents in the previously established security questions is selected from memory area 925. At step 1030, the process retrieves the previously established answer from one of the users' accounts where the selected question was found with the retrieved answer corresponding to the selected question (e.g., the name of a teacher if the question pertains to the user's favorite teacher, etc.). The retrieved answer is stored in memory area 1035. At step 1040, the retrieved answer (stored in memory area 1035) is compared to the list of matching answers stored in memory area 940. The matching answers were previously gathered by searching the previously established security answers for the content included in the user's requested post.

A decision is made as to whether the retrieved answer matches one of the matching answers stored in memory area 940 (decision 1050). If the retrieved answer matches one of the matching answers stored in memory area 940, then decision 1050 branches to the "yes" branch for breach processing. During breach processing, at step 1060, the breach flag is set to TRUE to indicate that at least one of the previously established security questions and answers is compromised by the user's requested post. Also during breach processing, at step 1070, the previously established security question and answer found to match the requested post are stored in possible security breach memory area 955 along with the identifier of the owner (user) of the previously established security question and answer. This data is used in FIG. 9 to determine whether the owner of the previously established security question and answer is inadvertently attempting to compromise the security of his own previously established security questions and answers with the requested post so that the user can be properly warned.

A decision is made as to whether there are additional matching security questions in memory area 925 that need to be processed (decision 1080). If there are additional questions to process, then decision 1080 branches to the "yes" branch which loops back to select and process the next matching question from memory area 925 as described above. This looping continues until all of the matching questions from memory area 925, at which point decision 1080 branches to the "no" branch whereupon processing returns to the calling routine (see FIG. 9) at 1095.

Figure 11:
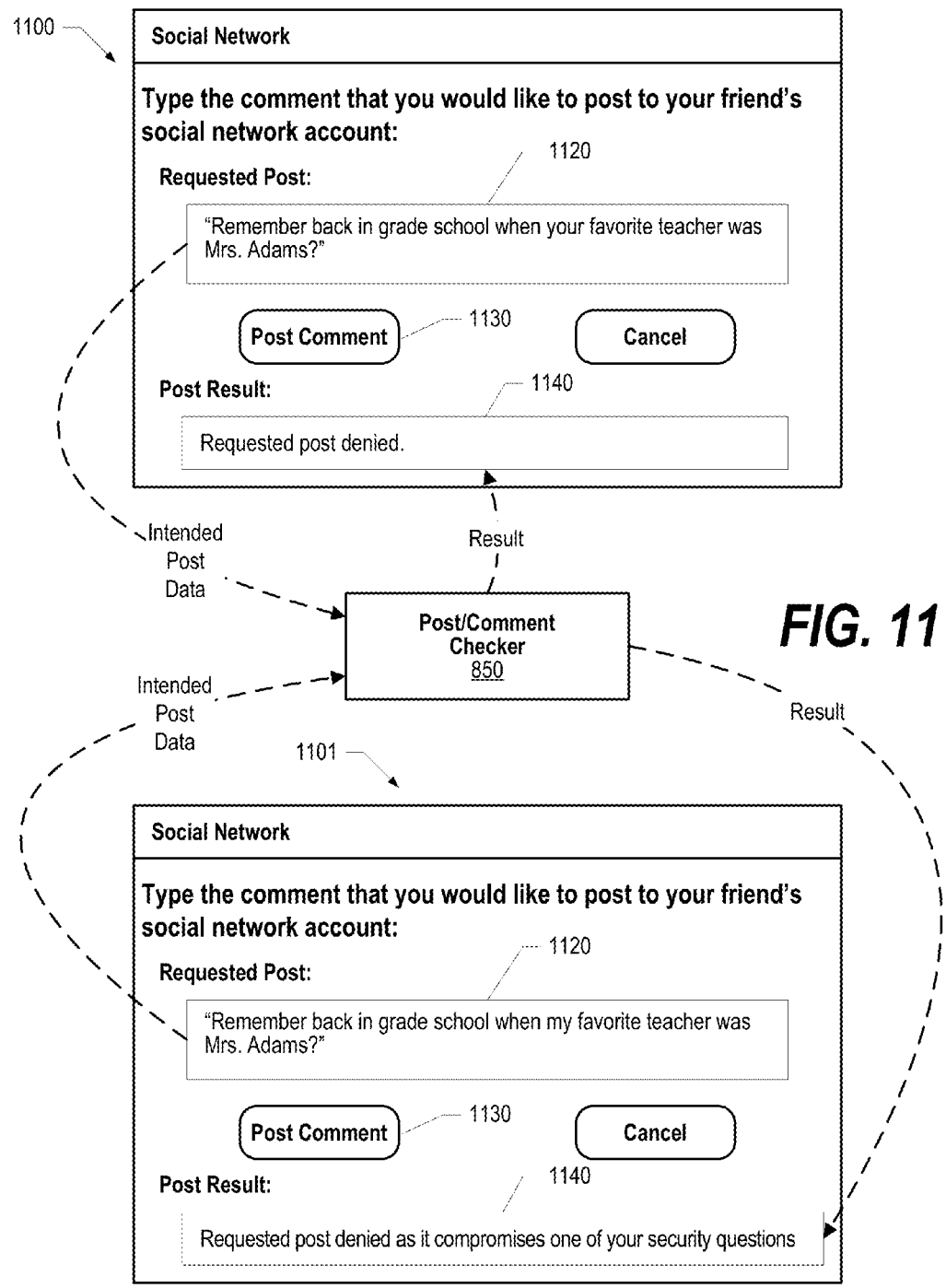
FIG. 11 is an exemplary screen diagram that shows post results transmitted to two different users when the users' posts are rejected.

FIG. 11 is an exemplary screen diagram that shows post results transmitted to two different users when the users' posts are rejected. User 1100 (top window) depicts a user that is not the owner of the previously established security question and answer that matches user 1100's requested post ("Remember back in grade school when your favorite teacher was Mrs. Adams?"). On the other hand, user 1101 (bottom window) depicts a user that is the owner of the previously established security question and answer that matches user 1100's requested post ("Remember back in grade school when your favorite teacher was Mrs. Adams?").

Each user enters the requested post into text box 1120 and selects "Post Comment" command button 1130 to request that the post be made to a social network. The requested post content is received by post checker process 850 that checks whether one or more previously established security questions and answers would be compromised by the requested post. The post reply from post checker process 850 is display area 1140 within the respective windows. In top window 1100 (the non-owner of the previously established security questions and answers matching the requested post content), post reply 1140 does not indicate the identity of the owner(s) of the previously established security questions and answers whose security would be compromised by the requested post. However, in bottom window 1101 (the owner of the previously established security questions and answers matching the requested post content), post reply 1140 warns the owner (user requesting the post) that one of the user's previously established security questions and answers would be compromised by the requested post.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system, the method comprising:

receiving a security question and a security answer associated with the security question;

querying one or more network-accessible data stores with a first query using the security answer as a search term;

receiving first search results corresponding to the first query;

determining, by one or more processors, a risk level of the received security question and security answer based, at least in part, on the first search results;

accepting the received security question and security answer in response to the identified risk level being an acceptable risk level;

storing the received security question and security answer in a data store that includes a plurality of existing security questions and a plurality of existing security answers;

periodically rechecking the security of each of the stored existing security questions, the rechecking comprising:

searching the one or more network-accessible data stores for each of the existing security answers, the searching resulting in a plurality of updated search results;

identifying an updated risk level pertaining to each of the existing security questions based, at least in part, on the plurality of updated search results;

retrieving one or more user account identifiers corresponding to each of the existing security questions where the updated risk level is at the unacceptable risk level; and alerting the user to each of the updated risk levels that are at the unacceptable risk level, wherein the alerting further comprises notifying the user of the retrieved user account identifiers.

2. The method of claim 1 further comprising:

calculating the risk level, wherein the calculation is based on an accessibility of the security answer associated with the received security question and a level of association of the security answer with the user.

3. The method of claim 1 further comprising:

retrieving a sensitivity level that corresponds to the user; and comparing the updated risk level with the sensitivity level, wherein the alerting is performed based on the comparison.

4. A method comprising:

presenting, through a user interface, a user with a potential security question;

receiving, from the user and through the user interface, an answer to the potential security question;

defining, by one or more processors, a first set of search terms based on the potential security question;

defining a second set of search terms based on the answer;

sending, to a search engine, a search query including at least one search term from the first set of search terms and at least one search term from the second set of search terms;

receiving, from the search engine, a response data set including a plurality of webpage identification data sets, with each web page identification data set including data identifying a web page determined, by the search engine, to be relevant to the search query; and determining a risk level value based at least in part upon content of web pages identified by the plurality of web page identification data sets.

5. The method of claim 4 wherein the search query excludes any search terms indicative of an identity of the user.

6. The method of claim 4 wherein the potential security question and the answer are related to facts likely to be known by and remembered by the user.

7. The method of claim 4 further comprising:

determining whether the risk level is less than a threshold value; and responsive to the determination that the risk level value is less than the threshold value, posing, through the user interface, a security challenge using the potential security question and the answer.

* * * * *